Sept. 23, 1930.                H. VOELLMY                  1,776,712
          APPARATUS FOR DETERMINING THE REFRACTION AND DISPERSION
                            Filed Jan. 12, 1928
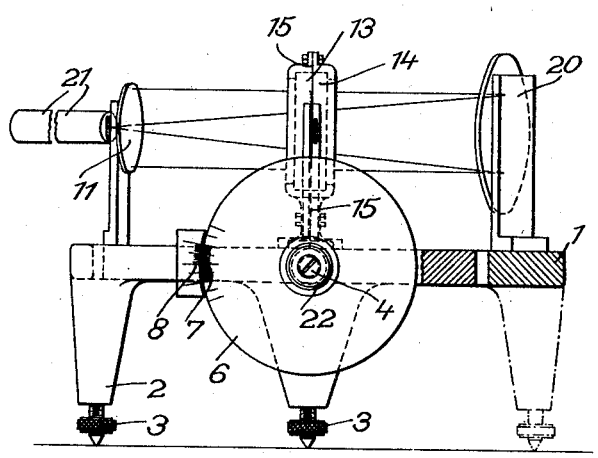
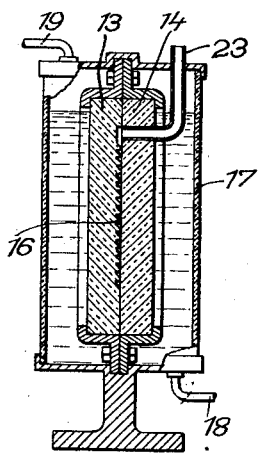
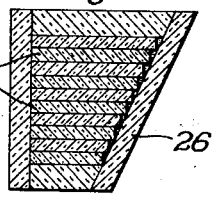
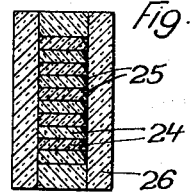
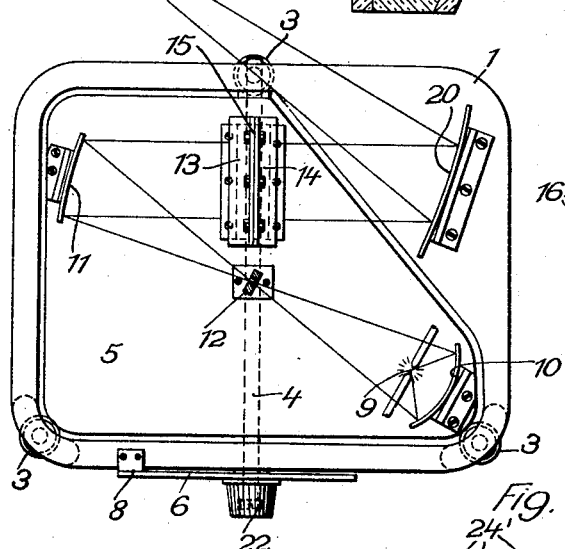
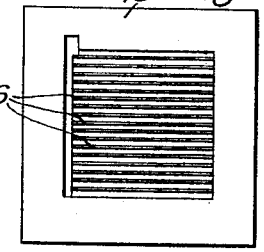
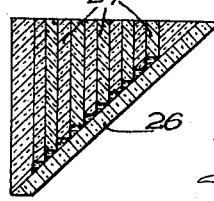
Inventor:
Hans Voellmy Patented Sept. 23, 1930

1,776,712

UNITED STATES PATENT OFFICE

HANS VOELLMY, OF BASEL, SWITZERLAND

APPARATUS FOR DETERMINING THE REFRACTION AND DISPERSION

Application filed January 12, 1928, Serial No. 246,273, and in Germany January 17, 1927.

The subject matter of the present invention is an apparatus for exactly determining the refraction and dispersion for rays of any wave length through substances in a vaporous, liquid or solid state. The well-known refractometers serve for exactly determining the refraction of a determined monochrome ray in the visible area of the spectrum. The principle of this refractometer is based either on the deviation of the ray by a prismatic vat containing the substance or by a total reflection from a very thin layer of the substance. As the optical parts of these apparatus are made of glass the apparatus cannot be used for any other kinds of rays except the visible rays.

These apparatus have been sufficiently efficient for the special purpose intended by the scientists who published their experiments, however, they are difficult to handle and present the considerable disadvantage that measurements cannot be made at points of the absorption spectrum where only a slight absorption takes place, as the permeability for rays is too small owing to the large thickness of the layer. It has been proposed to overcome this disadvantage by utilizing very small prisms of the substance, however, the accuracy of their measurement is insufficient.

An apparatus involving the method of crossed prisms has proved to be considerably more handy, to take up less time in handling it and to be very suitable. A prismatic trough of quartz for receiving the substances yields a spectrum the image of which is thrown along the gap of a quartz spectrograph. On the photographic plate a continuous curved dispersion spectrum is obtained which is more or less inclined towards the ordinary spectrum in accordance with the degree of the dispersion and from which the absolute coefficients of refraction could be arrived at for any point of the spectrum. This apparatus permits a very high degree of accuracy to be obtained particularly in measuring the dispersion; the permeability of the parts with a higher absorption capacity is, however, much too small for the rays. At any rate the accuracy was sufficient to get a general idea of the refraction of some important organic liquids such as benzene, toluol etc. and the feature has shown itself that particularly in the neighbourhood of the places of absorption, which are almost always situated in the ultra-violet portion of the spectrum, the coefficients of refraction increase very much and that measurements in these parts are of great scientific and technical interest, with a view of identifying substances. Many substances the coefficients of refraction of which are alike or very near to each other in the visible part of the spectrum would in the ultraviolet part of the spectrum give coefficients that differ considerably from each other and permit to easily distinguish the substances from each other.

It is the object of the present invention to provide an apparatus which permits an easy handling and to determine in a very short time the refraction of substances in the ultraviolet and the visible range of the spectrum and which may be widely employed.

The method according to the present invention comprises introducing the substance to be tested into a plurality of similar and unidirected prismatic chambers arranged transversely to the direction of the rays and in projecting a bundle of parallel rays of white light on these prisms of the substance, causing them to be deviated by these prisms and to be decomposed into rays of different wave length, and in uniting the rays of the same wave length after the refraction, for the purpose of adding the actions of all the prisms and of obtaining a spectrum of increased brightness.

In this manner the optical prisms are passed by the rays at the point of the smallest thickness of the layer of substance.

A plurality of prisms has already been used for producing a plurality of images in different colours of one object, whereby the prisms are immersed in a liquid which has the same refractory power as glass for a determined colour. A device of this type can, however, not be used to make the ultraviolet range of the spectrum accessible to research as the arrangement of glass prisms within a liquid totally absorbs ultra-violet rays.

Constructional examples of the subject matter of the present invention are illustrated on the accompanying drawings, in which:

Fig. 1 is an elevation with parts shown in section of a refractometer,

Fig. 2 is a plan view of Fig. 1,

Fig. 3 shows a detail,

Fig. 4 shows in a vertical section a detail,

Figs. 5-7 show detail modifications.

Referring now to the constructional example illustrated in Figs. 1-3, a frame 1 is supported on three legs 2 and may be adjusted horizontally by means of the adjusting screws 3. A horizontal axle 4 is mounted in the frame 1 and a plate 5 is turnably mounted about the axle 4. The angular extent of the turning may be read off a scale 7 provided on a disc 6 fixed to the axle 4. A vernier 8 fixed to the frame 1 permits accurate readings of the turning movements.

On the plate 5 a point shaped source of light 9 is provided, which is for instance generated by an iron-cadmium spark gap. Further two concave mirrors 10 and 11 are arranged on the plate 5. The focal distance of the concave mirror 10 is so chosen that the rays from the source of light 9 impinging on the mirror are reflected to one point. In this point a diaphragm 12 provided with a gap is arranged. The focal distance of the concave mirror 11 is so chosen that the rays passing through the gap of the diaphragm 12 are reflected by the concave mirror 11 as parallel beams. Above the axle 4 the device for receiving the substance to be examined is arranged. This device consists of two plane and parallel plates of quartz 13, 14, which contact with one face with each other and are held together by the covers 15. The plate 13 (Fig. 3) is provided with grooves 16 of a triangular cross-section and which are horizontally disposed and parallel to each other. The grooves 16 in the plate 13 are covered by the plate 14 and in the chambers thus formed the substances to be examined are filled. Further the device for holding the substances to be examined is provided with a branch pipe 23 by means of which the pressure inside the device may be regulated by height of the hydrostatic column or otherwise. In order to permit an examination of substances at different temperatures the plates 13 and 14 may, for instance, be placed in a casing 17 made of quartz and provided with a supply branch and a discharge branch 18, 19 respectively (Fig. 4), whereby the substance contained in the grooves 16 may be kept at any desired temperature by a heating or cooling liquid or a vapour circulating through the casing 17. In this manner the substances to be examined may be subjected to physical influences from outside (pressure and temperature) within wide limits.

On the frame 1 a concave mirror 20 is arranged for collecting the rays emanating from the device containing the substances and focussing the reflected rays.

In the focal distance of the mirror 20 there is the gap of the diagrammatically illustrated spectrograph 21, in which a clear image of the dispersion spectrum is present and which is once more dispersed in the vertical direction by the prism of the spectrograph, so that on the photographic plate of the spectrograph an inclined or curved dispersion spectrum is obtained which may be readily measured.

The manner of operation of the above described apparatus is as follows:

A portion of the rays emanated by the source of light impinges on the concave mirror 10 and converges to a point in which the diaphragm 12 is arranged. The other rays emanating from the source of light are screened off. From the diaphragm 12 the bundle of rays impinges on the concave mirror 11, where it is reflected as a bundle of parallel rays and impinges vertically on the quartz plate 13. The rays enter the plate 13 without being deviated and some of them leave the plate without deviation provided a ray passes through two grooves. These non-refracted rays serve for comparison with the refracted rays.

Those rays which impinge the spaces 16 containing the substance are deviated and the deviation is different according to the wave length so that no longer a white ray leaves the device but the single rays of different wave length arranged one beside the other.

Every single groove produces a separate spectrum whereby the rays of the same wave length are parallel to each other after the refraction, as all the grooves or hollow spaces are similar, i. e. have the same angles of incidence and of refraction.

The mirror 20 unites all the parallel rays of the same wave length in a point in its focal plane. As this is the case with all the monochrome bundles of rays of the different wave lengths impinging under various angles of incidence a complete sharp image of the spectrum is obtained in the focal plane which, as has been mentioned above, may be observed by means of the spectrograph.

In order to obtain in the spectrograph that portion of the spectrum which is desired for measuring purposes the plate 5 together with the quartz plates 13 and 14 may be turned. Thereby the rays are lifted or lowered in their vertical plane until the desired portion of the spectrum appears in the gap of the spectrograph. The amount of the angular displacement of the plate 5, which may be read off on the scale 7 and the vernier 8 and the observations in the spectrograph permit determination of the refraction of substances for rays of any wave length.

Instead of the prismatic hollow chambers produced by grooves of triangular profile prismatic chambers may be used which are formed in a different manner. For instance a plurality of parallel plates 24 (Fig. 5) having a bevelled edge 25 may be placed one above the other so that the outermost part of the edge 25 is in contact with a plate 26 forming one side of a receptacle. The plates 24 may be exchanged for others having differently bevelled edges 25.

Figs. 6 and 7 show modified constructions for obtaining hollow chambers by means of a plurality of parallel plates 24'.

I claim:

1. In an apparatus of the type described, a device composed of quartz plates arranged to form a plurality of prismatic pockets to receive the substance to be examined and to shape the latter to form a plurality of small similar prisms, optical means to project a bundle of parallel rays of white light through said device, means to collect the refracted and decomposed rays of the same wave length to produce the dispersion spectrum, and means to influence the pressure of the substance enclosed in said device.

2. In an apparatus of the type described, in combination, a device comprising a plurality of parallel quartz plates arranged in close proximity and enclosing between them a plurality of prism shaped hollow spaces for receiving the substance to be examined, and optical means to project a bundle of parallel rays of white light through said hollow spaces containing the substance as small prisms and means to collect the dispersed and decomposed rays of different wave length and converge the rays of the same wave length to a point.

3. In an apparatus of the type described, in combination, a device comprising a plurality of parallel quartz plates having bevelled edges and placed one above the other and inserted between other quartz plates one of which contacts with said bevelled edges to form hollow spaces of triangular cross-section for receiving the substance to be examined, and optical means to project a bundle of parallel rays of white light through said hollow spaces containing the substance as small prisms and a concave reflector to collect the dispersed and decomposed rays of different wave length and converge the rays of the same wave length to a point.

4. In an apparatus of the type described, in combination, a device comprising a plurality of parallel quartz plates arranged in close proximity and enclosing between them a plurality of prisms shaped hollow spaces for receiving the substance to be examined, a source of light, means to project a bundle of parallel rays of white light through said device, and means to collect the dispersed and decomposed rays of different wave length converge the rays of the same wave length to a point, a turnable plate on which said source of light, said device and said first mentioned means are mounted, and means for ascertaining the amount of angular displacement between said plate and said rays collecting means.

5. In an apparatus of the type described, in combination, a device comprising a plurality of parallel quartz plates arranged in close proximity and enclosing between them a plurality of prism shaped hollow spaces for receiving the substance to be examined, a source of light, means to project a bundle of parallel rays of white light through said device, and means to collect the dispersed and decomposed rays of different wave length and converge the rays of the same wave length to a point, a frame on which said collecting means are mounted, a plate turnably mounted in said frame and on which said source of light, said device and said first mentioned means are mounted, and means for ascertaining the amount of angular displacement between said plate and said frame.

6. A method of examining spectra of substances for rays of any wave length, which comprises arranging the substance to be examined in a plurality of similar unidirected prismatic shapes, projecting a bundle of parallel rays of white light through the several shapes to form a plurality of spectra, collecting the several spectra and projecting them as a single spectrum to an analyzing instrument.

7. A method of examining spectra of substances for rays of any wave length, which comprises arranging the substance to be examined in a plurality of similar unidirected prismatic shapes, projecting a bundle of parallel rays of white light through the several shapes to form a plurality of spectra, collecting the several spectra and projecting them as a single spectrum to an analyzing instrument, and shifting the spectrum with respect to said instrument.

8. A method of examining spectra of substances for rays of any wave length, which comprises confining the substance to be examined in quartz retaining similar and parallel prismatic shapes sufficiently small to prevent absorption of ultra visible rays, passing white light through the substance while so confined to disperse light passing therethrough, combining the rays of wave length of the several spectra so produced and focussing them to an analyzing instrument.

In testimony whereof I have signed my name to this specification.

HANS VOELLMY.